US011936085B2

(12) United States Patent
Jian et al.

(10) Patent No.: US 11,936,085 B2
(45) Date of Patent: Mar. 19, 2024

(54) CERAMIC WAVEGUIDE FILTER

(71) Applicants: Chunyun Jian, Ottawa (CA); Mi Zhou, Nepean (CA)

(72) Inventors: Chunyun Jian, Ottawa (CA); Mi Zhou, Nepean (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 128 days.

(21) Appl. No.: 17/621,795

(22) PCT Filed: Jul. 16, 2019

(86) PCT No.: PCT/IB2019/056084
§ 371 (c)(1),
(2) Date: Dec. 22, 2021

(87) PCT Pub. No.: WO2021/009545
PCT Pub. Date: Jan. 21, 2021

(65) Prior Publication Data

US 2022/0359966 A1 Nov. 10, 2022

(51) Int. Cl.

| | |
|---|---|
| ***H01P 1/20*** | (2006.01) |
| ***H01P 3/08*** | (2006.01) |
| ***H01P 3/16*** | (2006.01) |
| ***H01P 5/08*** | (2006.01) |

(52) U.S. Cl.
CPC .............. *H01P 1/2002* (2013.01); *H01P 3/08* (2013.01); *H01P 3/16* (2013.01); *H01P 5/087* (2013.01)

(58) Field of Classification Search
CPC .......... H01P 1/2002; H01P 1/20; H01P 1/201; H01P 1/203; H01P 1/20309; H01P 1/20327; H01P 1/207; H01P 1/208; H01P 1/2088; H01P 3/08; H01P 3/16; H01P 5/087
See application file for complete search history.

(56) References Cited

U.S. PATENT DOCUMENTS

| | | | |
|---|---|---|---|
| 9,466,864 | B2 | 10/2016 | Rogozine |
| 2003/0025572 | A1 | 2/2003 | Maekawa |
| 2003/0040440 | A1 | 2/2003 | Wire |
| 2003/0198032 | A1 | 10/2003 | Collander |
| 2014/0128012 | A1 | 5/2014 | Zhou |

(Continued)

FOREIGN PATENT DOCUMENTS

| | | | |
|---|---|---|---|
| CN | 101841371 | A | 9/2010 |
| CN | 202353518 | U | 7/2012 |
| CN | 104900597 | B | 6/2018 |

(Continued)

OTHER PUBLICATIONS

CN109449546A Translation Mar. 8, 2019.*
Office Action, CN App. No. 201980098455.2, dated Oct. 25, 2023, 14 pages.

*Primary Examiner* — Stephen E. Jones
(74) *Attorney, Agent, or Firm* — Ericsson Canada Inc.

(57) ABSTRACT

A composite electronic device comprises a ceramic waveguide, CWG, device having at least two input/output, I/O, ports; and a ceramic stripline, CS, device comprising at least one stripline transmission paths having at least two I/O ports. The CS device is affixed to the CWG device such that at least one of the I/O ports of the CWG device is electrically connected to a corresponding one I/O port of the CS device.

11 Claims, 10 Drawing Sheets

Section A-A

(56) References Cited

U.S. PATENT DOCUMENTS

| | | | |
|---|---|---|---|
| 2015/0077195 | A1 | 3/2015 | Khanna |
| 2015/0255431 | A1 | 9/2015 | Su |

FOREIGN PATENT DOCUMENTS

| | | | |
|---|---|---|---|
| CN | 109449546 | A | 3/2019 |
| CN | 109818117 | A | 5/2019 |
| CN | 110011010 | A | 7/2019 |
| EP | 2503858 | B1 | 12/2013 |

* cited by examiner

Section A-A

Section A-A

Section A-A

Section B-B

Section A-A

Section A-A

Section A-A

Section A-A

Section A-A

Section A-A

CERAMIC WAVEGUIDE FILTER

TECHNICAL FIELD

The present disclosure relates to ceramic waveguide filter devices.

BACKGROUND

Ceramic waveguide (CWG) filters are a promising solution for 5G Advanced Antenna System (AAS) radio front-end design due to its smaller size, lower weight and lower cost, as well as its relatively higher Q factor compared with other types of filters such as air cavity filter, dielectric cavity filter and ceramic monoblock filter etc.

FIG. 1 shows a general Frequency Division Duplex (FDD) type radio front-end 100 that includes a CWG duplexer 102 coupled to an antenna 104. A power amplifier (PA) 106 is coupled to the CWG duplexer 102 via a transmit lowpass filter (Tx LPF) 108, and a Low noise amplifier (LNA) 110 is coupled to the CWG duplexer 102 either directly or optionally via a receive lowpass filter (Rx LPF) 112.

The CWG duplexer 102 is composed of a transmit bandpass filter (Tx BPF) 114 and a receive bandpass filter (Rx BPF) 116. The Tx BPF 114 operates to couple transmission (Tx) radio signals output from the PA 106 to the antenna 104, while the other Rx BPF 116 operates to couple inbound (Rx) radio signals from the antenna 104 to a the Rx LNA 110.

The Tx and Rx LPFs 108 and 112 may be used with the CWG duplexer 102 in order to meet radio system requirements. These LPFs generally need to be in small size, which can be satisfied by the use of ceramic monoblock type LPF or Surface Acoustic Wave (SAW) or Bulk Acoustic Wave (BAW) type filter. However, these types of LPF filters tend to be lossy, and accordingly they are not a preferred option at least for the TX path.

One possible design option for the Tx LPF 108 is to use a two dimensional (2D) type transmission line LPF filter constructed on the RF printed circuit board (PCB). However, this solution tends to occupy a large area on the PCB, which is undesirable.

Furthermore, since the CWG duplexer 102 and the LPF(s) 108 and 112 are manufactured as separate components, some form of cabling or transmission line is needed to connect them together. However, such connections create additional losses, and occupy further area on the PCB. As a consequence, the use a CWG duplexer 102 for the radio front-end 100 yields very little benefit in terms of size reduction as compared to solutions that do not use CWG components.

There is another problem with conventional CWG duplexer applications, which is the reliability issue.

FIGS. 2 & 3 show respective examples of a conventional CWG duplexer 102 mounted on an RF PCB 202. In the example of FIG. 2, the CWG duplexer 102 is configured as a generally rectangular block, which is connected to the PCB 202 via a plurality of solder bumps 204. Respective Tx and Rx ports 206 and 208 are provided by means of connectors located on a top surface of the duplexer 102, to facilitate connection to the PA 106 and LNA 110 via suitable cables. On the bottom of the duplexer 102, one of the solder bumps also serves as an antenna port 210, which facilitates connection to the antenna 104 via suitable transmission lines (not shown) on the PCB 202.

In the example of FIG. 3, the CWG duplexer 102 is of similar construction as in the example of FIG. 2, except that the Tx and Rx ports 206 and 208 are also provided as solder bumps on the bottom of the duplexer 102.

For conventional CWG materials, the coefficient of thermal expansion (CTE) is about 5 ppm/C or less. In contrast, commonly used RF PCBs (such as well known FR4, or Megatron 6) have a CTE of about 15 ppm/C. Therefore, there is always a large thermal mismatch between the CWG filter/duplexer (and, more generally, any CGW device) and the RF PCB.

In addition, a typical CWG duplexer has a dimension of about 70 mm×40 mm×15 mm for 2 GHz application, the maximum distance between two edge solder bumps tends to be relatively large as shown in FIGS. 2 & 3. Taken together, the combination of the large thermal mismatch and the large distance between edge solder bumps results in high stresses in the edge solder bumps. These stresses tend to vary with temperature, which leads to fatigue cracking and eventual failure of the solder bumps.

Technically, the reliability of a CWG filter/duplexer mounted on the RF PCB is determined by two main factors: one is the difference of the mismatched CTEs; another is the maximum distance of any two solder bumps. Therefore, in order to improve the CWG filter/duplexer reliability, it is necessary to reduce either or both of the CTE difference and the maximum distance between adjacent solder bumps.

However, there is almost no choice to reduce the CTE difference because from a filter design point of view, the lower CTE the CWG has the more stable performance the CWG filter/duplexer has over entire temperature range, on other hand the current widely used RF PCB material such as FR4 or Megatron 6 can not be simply replaced with any new lower CTE PCB material.

SUMMARY

An aspect of the present invention provides a composite electronic device comprises a ceramic waveguide, CWG, device having at least two input/output, I/O, ports; and a ceramic stripline, CS, device comprising at least one stripline transmission path having at least two I/O ports. The CS device is affixed to the CWG device such that at least one of the I/O ports of the CWG device is electrically connected to a corresponding one I/O port of the CS device.

BRIEF DESCRIPTION OF THE DRAWINGS

The accompanying drawing figures incorporated in and forming a part of this specification illustrate several aspects of the disclosure, and together with the description serve to explain principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

At least some of the following abbreviations and terms may be used in this disclosure.

2D Two Dimensional
3GPP Third Generation Partnership Project
5G Fifth Generation
AAS Advanced Antenna System
ASIC Application Specific Integrated Circuit
CWG Ceramic Waveguide
FDD Frequency Division Duplex
BPF Bandpass Filter
LPF Lowpass Filter
CTE Coefficient of Thermal Expansion
CS LPF Ceramic Stripline LPF Embodiments of the present invention provide a composite electronic device that comprises a ceramic waveguide, CWG, device having at least two input/output, I/O, ports; and a ceramic stripline, CS, device comprising at least one stripline transmission path having at least two I/O ports. The CS device is affixed to the CWG device such that at least one of the I/O ports of the CWG device is electrically connected to a corresponding one I/O port of the CS device.

Figure 1:
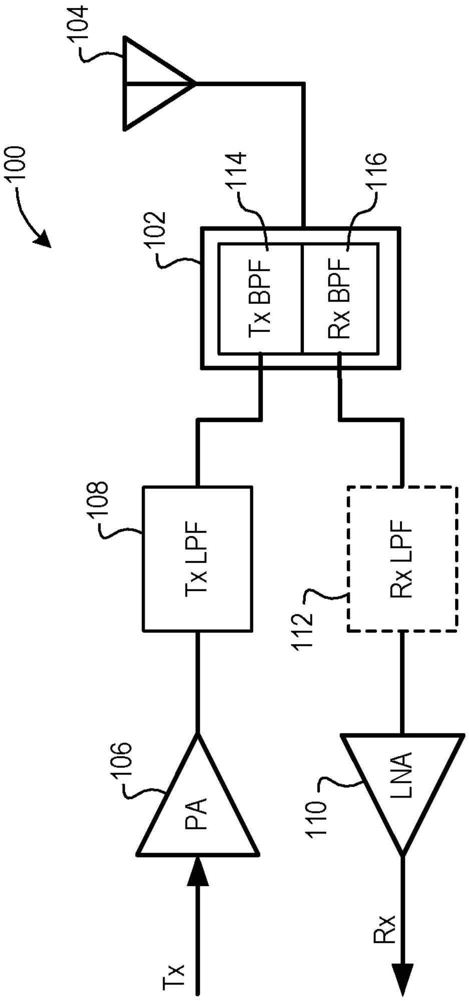
FIG. 1 (PRIOR ART)
FIG. 1 is a block diagram illustrating elements of a conventional radio front-end.
Figure 2A:
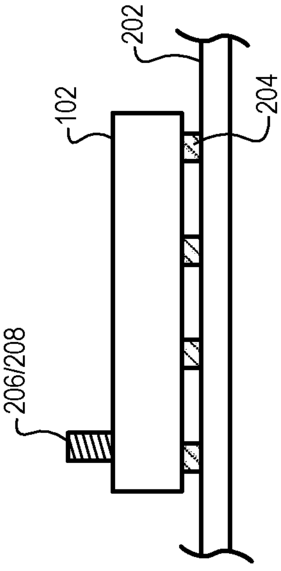
FIG. 2A (PRIOR ART)
FIGS. 2A-2C respectively show side, top and bottom views of an example ceramic waveguide (CWG) duplexer known in the art.
Figure 2B:
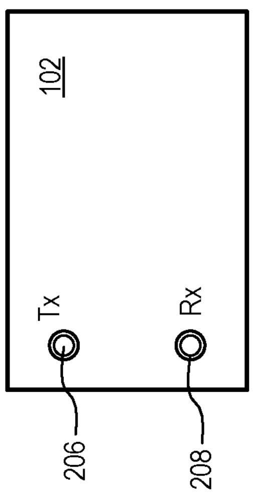
FIG. 2B (PRIOR ART)
Figure 2C:
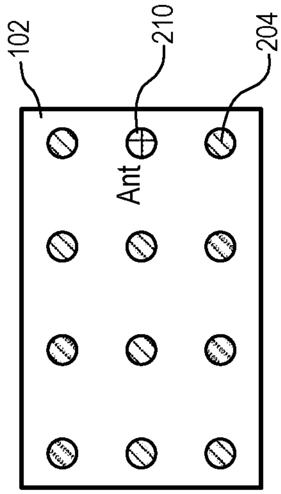
FIG. 2C (PRIOR ART)
Figure 3A:
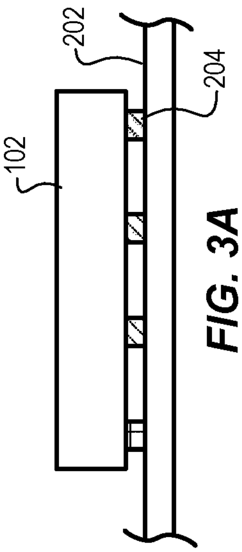
FIG. 3A (PRIOR ART)
FIGS. 3A and 3B respectively show side and bottom views of a second example CWG duplexer known in the art.
Figure 3B:
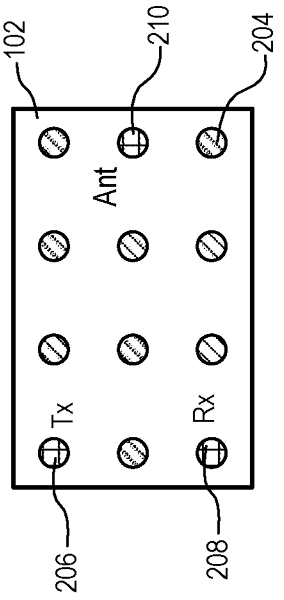
FIG. 3B (PRIOR ART)
Figure 4A:
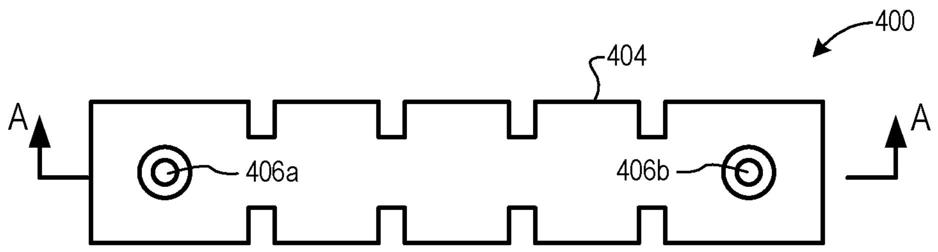
FIGS. 4A and 4B respectively show top and side cross-sectional views of an example CWG bandpass filter (BPF)
Figure 4B:
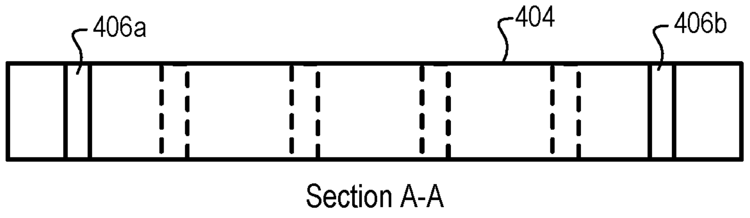

FIGS. 4A-E illustrate example ceramic filter structures. FIGS. 4A and 4B respectively show top and side cross-sectional views of an example ceramic waveguide (CWG) bandpass filter (BPF) 400, while FIGS. 4C-4E respectively show top, side cross-sectional and top cross-sectional views of an example ceramic stripline (CS) lowpass filter (LPF) 402.

The example CWG BPF 400 shown in FIGS. 4A and 4B comprises a CWG body 404 and a pair of vias 406*a* and 406*b* that serve to couple electrical energy into and out of the CWG body 404. As may be seen in FIG. 4A, the vias 406*a* and 406*b* are exposed on the top surface of the CWG body 404, which consequently serve as input/output I/O ports by which the CWG BPF 400 may be connected to other components (eg. by means of suitable solder connections, for example). Alternatively, the vias 406*a* and 406*b* may be exposed on respective opposite surfaces of the CWG body 404, if desired.

Figure 4C:
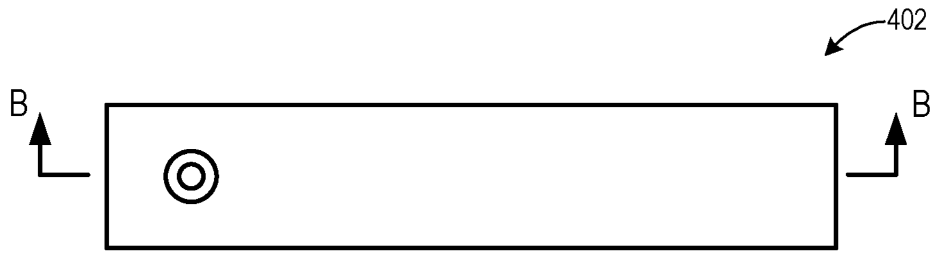
FIGS. 4C-4E respectively show top, side cross-sectional and top cross-sectional views of an example ceramic stripline (CS) lowpass filter (LPF)
Figure 4D:
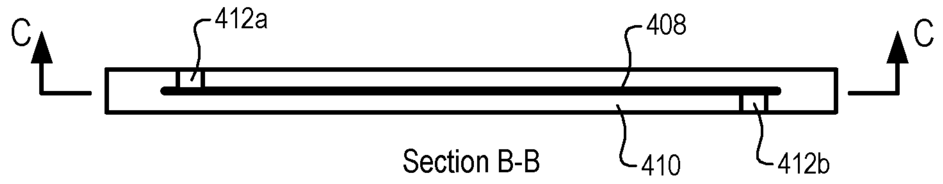
Figure 4E:
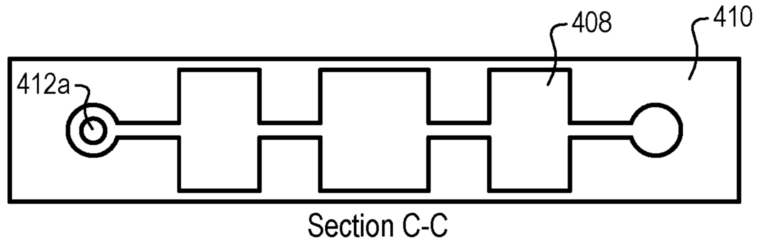

The example CS LPF 402 shown in FIGS. 4C-4E comprises a metal layer 408 disposed on a ceramic substrate 410, and a pair of vias 412*a* and 412*b* that serve to couple electrical energy to and from of metal layer 408. As may best be seen in FIG. 4D, the vias 412*a* and 412*b* are exposed on opposite surfaces of the CS LPF 402, which consequently serve as input and output ports by which the CS LPF 402 may be connected to other components (eg. by means of suitable solder connections, for example). Alternatively, the vias 412*a* and 412*b* may be exposed on a common surface of the CS LPF 402, if desired.

By appropriate selection of the ceramic materials used in the CWG BPF 400 and the CS LPF 402, these two devices can be constructed with similar dimensions in the horizontal plane, but with respective different heights. Accordingly, two or more such devices may be bonded together to yield a composite device as may be seen in FIGS. 5-8.

Figure 5A:
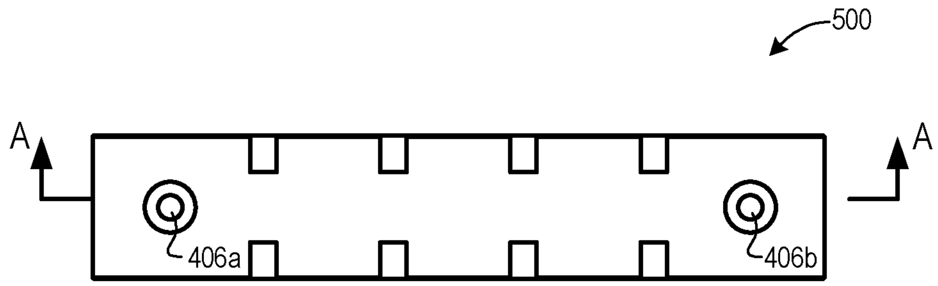
FIGS. 5A-5C respectively show top, side cross-sectional and bottom views of an example CWG BPF/CS LPF in accordance with representative embodiments of the present invention.
Figure 5B:
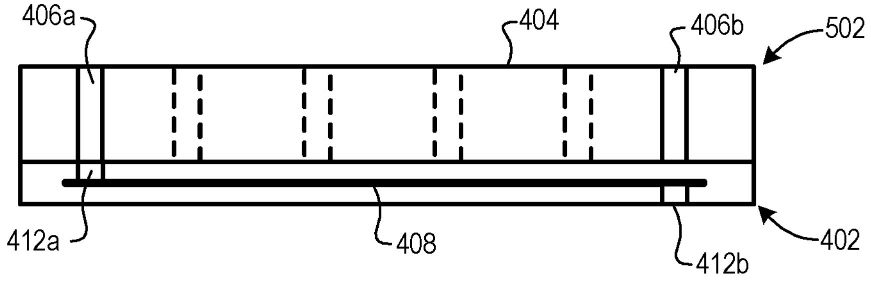
Figure 5C:

FIG. 5 shows an example composite device 500 comprising a CWG BPF 502 bonded to the CS LPF 402 illustrated in FIGS. 4C-4E. The CWG BPF 502 is similar to that illustrated in FIGS. 4A and 4B. The via 406*a* of the CWG BPF 502 is electrically connected to via 412*a* of the CS LPF 402, for example by means of solder (not shown in FIG. 5). Known bonding techniques and materials (such as thermal adhesives, for example) may be used to mechanically secure the CWG and CS devices together. Since both devices are constructed of ceramic materials, the CTE mismatch between the two devices is minimal, even when different ceramic compositions are used in each device. Consequently, thermally induced stresses in the adhesive bond between the CWG and CS devices will also be minimal.

Figure 6A:
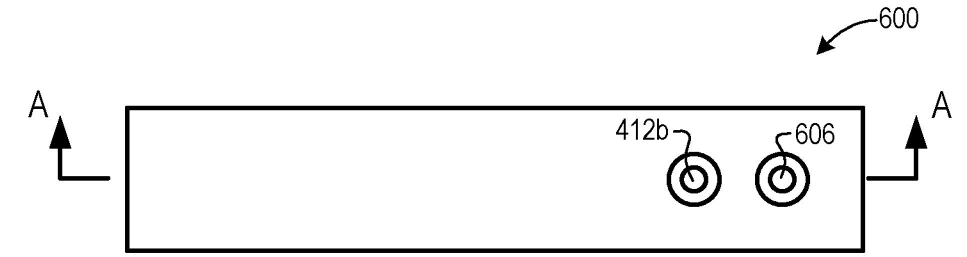
FIGS. 6A-6C respectively show top, side cross-sectional and bottom views of a second example CWG BPF/CS LPF in accordance with representative embodiments of the present invention.
Figure 6B:
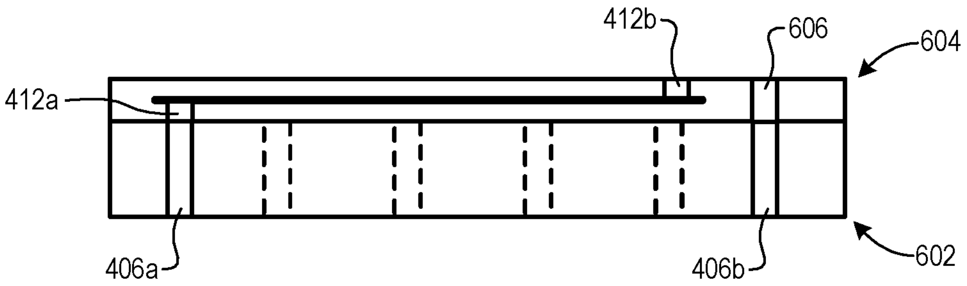
Figure 6C:
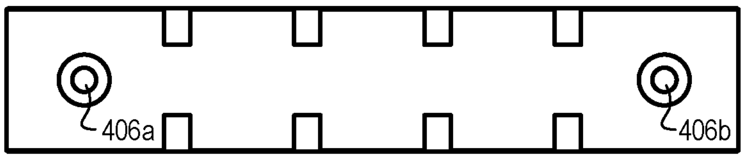

FIG. 6 shows another example composite device 600 comprising a CWG BPF 602 bonded to a CS LPF 604. In this example, the CWG BPF 602 is constructed such that both vias 406*a* and 406*b* are exposed on the same (e.g. upper) surface of the CWG BPF 602. In addition, the CS LPF 604 includes a through-via 606, which may align with via 406*b*. With this arrangement, vias 406*a* and 412*a* can be electrically bonded together (eg. by solder), and via 406*b* can be electrically connected to through via 606 (eg. by solder) so that vias 412*b* and 606 can be used as input/output (I/O) ports of the composite device 600.

FIGS. 7A-7E show an example composite device 700 comprising a duplexer 702 with one or more stripline filters

Figure 7C:
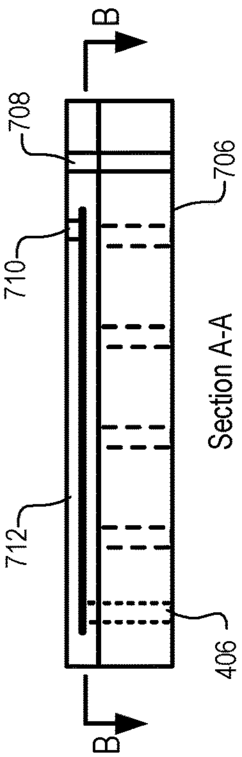
FIGS. 7B-7E respectively show top, side cross-sectional; top cross-sectional; and bottom views of the example composite device of FIG. 7A.
Figure 7D:
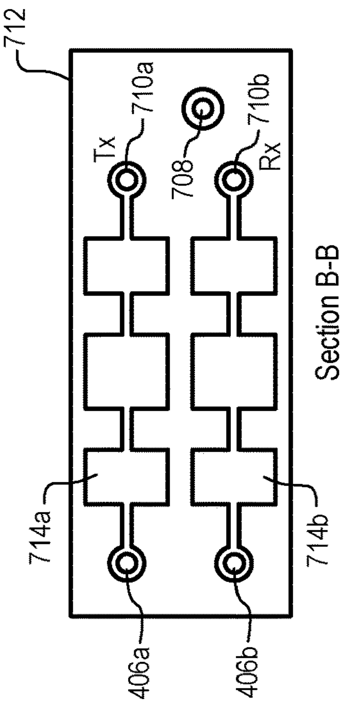
Figure 7E:
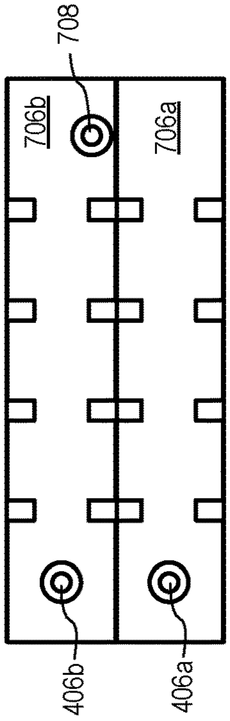
Figure 7A:
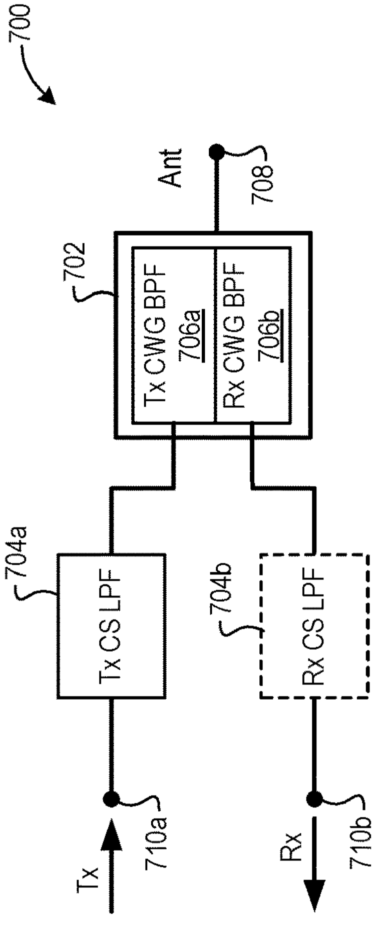
FIG. 7A is a block diagram schematically illustrating functional elements of an example composite device in accordance with representative embodiments of the present invention.
Figure 7B:
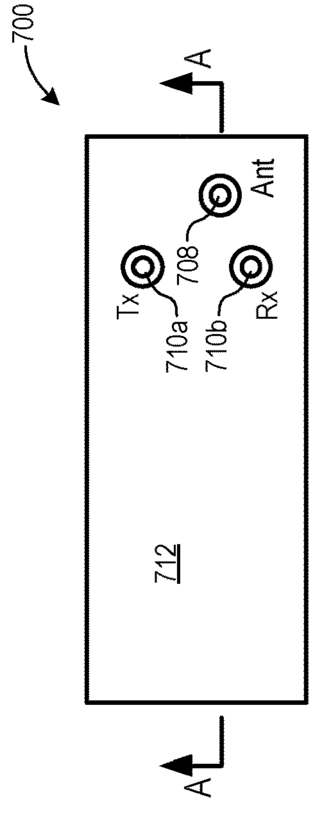

704*a* and 704*b* (FIG. 7A). The duplexer 702 is composed of a pair of parallel CWG BPFs 706*a* and 706*b* coupled to a common I/O port 708 which may be connected to an antenna 104. Each stripline filter 704*a*, 704*b* is connected between a respective one of the CWG BPFs 706*a* and 706*b* and a respective I/O port 710*a*, 710*b* which may be coupled to other electronic circuits such as power amplifier 106 and/or low noise amplifier 110.

In the example of FIG. 7, the CWG BPFs 706 are bonded to a CS device 712 that is configured to accommodate parallel RF stripline structures 714*a* and 714*b* connected between a respective I/O port 710 and an I/O via of a respective one of the two CWG BPFs 706. In this example, All three I/O ports 708, 710*a* and 710*b* are formed on the top of the composite device 700.

Figure 8A:
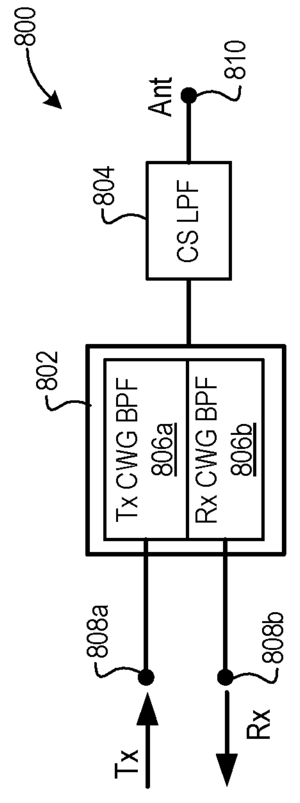
FIG. 8A is a block diagram schematically illustrating functional elements of an example composite device in accordance with representative embodiments of the present invention.
Figure 8B:
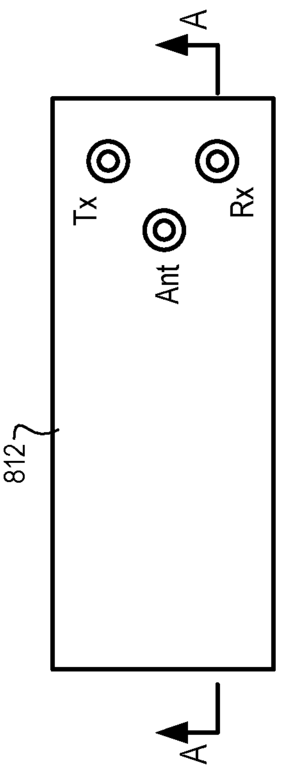
FIGS. 8B-8E respectively show top, side cross-sectional; top cross-sectional; and bottom views of the example composite device of FIG. 8A.
Figure 8C:
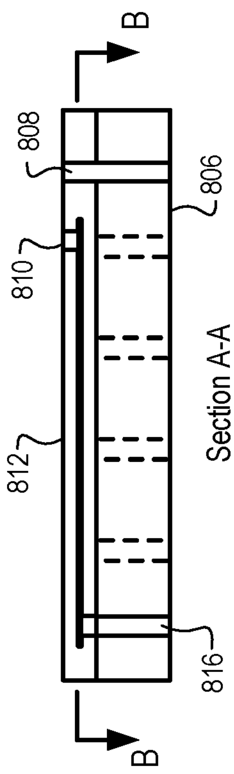
Figure 8D:
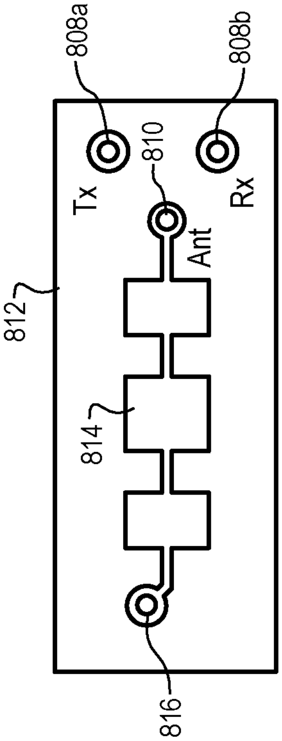
Figure 8E:
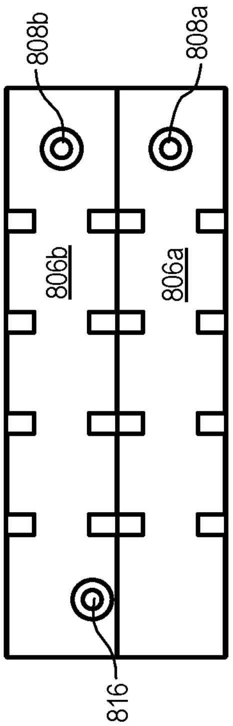

FIGS. 8A-8E show another example composite device 800 comprising a duplexer 802 connected with a stripline filter 804 (FIG. 8A). The duplexer 802 is composed of a pair of parallel CWG BPFs 806*a* and 806*b* coupled between respective I/O ports 808*a* and 808*b* and the stripline filter 804. The stripline filter 804 is connected between the duplexer 802 and an antenna port 810.

In the example of FIG. 8, the CWG BPFs 806 are bonded to a CS device 812 that is configured to accommodate an RF stripline structure 814 connected between antenna port 810 and a common I/O via 816 of the duplexer 802. In this example, all three ports 808*a*, 808*b* and 810 are formed on the top of the composite device 800.

As may be appreciated, one feature that common to all of the example composite devices described above with reference to FIGS. 5-8 is that adjoining CWG and CS devices may be electrically connected together by means of vias and solder, for example. As such, the connections between adjoining device are electrically very short, and consequently have very low loss. Another common feature is that in each composite device, CWG and CS devices are bonded together in a vertical stack. This means that a composite device (which may include two or more discrete CWG and CS devices) occupies less space on a PCB than would be the case if each device needed to be individually mounted on the PCB and interconnected by electrical wires or transmission lines.

The examples described above with reference to FIGS. 5-8 relate to duplexers formed by CWG BPFs bonded to one or more CS LPFs. However, it will be appreciated that other types of CWG and CS devices can be bonded together to obtain composite devices that perform other functions. Thus it will be seen that the present invention is not limited to embodiments in which CWG BPFs are bonded to one or more CS LPFs to form a duplexer.

As noted above, the reliability of CWG devices is closely related to thermally induced stresses in the solder connections between the CWG device and the PCB. These thermally induced stresses are a function of the difference between the respective coefficient of thermal expansion (CTE) of the CWG and PCB materials, and the spacing between the solder bumps connecting a CWG device to a PCB.

Embodiments of the present invention enable high reliability by minimizing the distance separating solder connections between CWG device and a PCB.

In some embodiments, solder connections provide both an electrical path and a mechanical joint between the CWG device and the PCB, and may be used for I/O ports and one or more ground connections that can be positioned close to the I/O ports.

In some embodiments, contact bumps provided on a CWG device serve to permit a sliding contact between a CWG device and the PCB. Such a sliding contact stabilizes the CWG device against vibration, for example, but permits sliding motion and so avoids thermally induced stresses. In some embodiments, at least three contact bumps are provided on a CWG device. The number of contact bumps can be greater than three, if desired. Contact bumps may be distributed around a periphery of the CWG device.

Contact bumps may be formed of any suitable material including, for example, plastic or metal. If desired, contact bumps may be formed of a solder material, which may have a different melting point than the solder material used to form the solder connections between the CWG device and the PCB. If desired, metal contact bumps may be arranged to slide on a metal layer of the PCB, and so provide a ground connection for the CWG device.

In some embodiments, two types of solder materials that have different melting points may be used to address the CWG filter/duplexer reliability issue. The solder material with lower melting point may be used to make solder bumps for the active ports (eg. Tx, Rx and Antenna I/O ports) and ground connections surrounding these active ports. The solder material with the higher melting point may be used to make contact bumps that will provide a mechanical support to the CWG filter/duplexer body and (optionally) an additional ground connection.

Figure 9A:
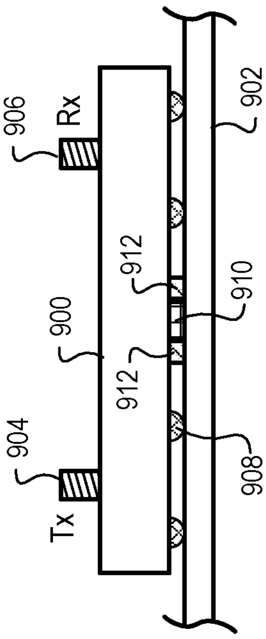
FIGS. 9A-9B respectively show side and bottom views of a third example CWG BPF/CS LPF duplexer in accordance with representative embodiments of the present invention.
Figure 9B:
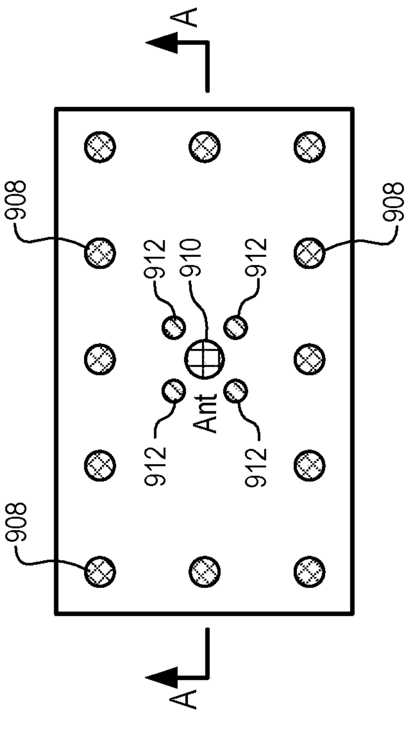

FIGS. 9A and 9B show an example CWG (or composite CWG/CS) device 900 mounted on an RF PCB 902. In the example of FIG. 9, TX and RX I/O ports 904 and 906 are provided as connectors on a top face of the device 900. As may be seen in FIG. 9B, a plurality of contact bumps 908 are provided around a perimeter of the bottom face of the device 900. An antenna I/O port 910 is centered on the bottom face of the device 900, and is surrounded by a set of ground ports 912.

In some embodiments, two different types of solder materials are used to form the contact bumps 908, and the ports 910 and 912. For example, the contact bumps 908 may be formed using a higher melting point solder material, while the ports 910 and 912 located at the centre of the device 900 may be made using a lower melting point solder material.

The contact bumps 908 play two roles: one is to provide a ground connection between the device 900 and the RF PCB 902, the other is a sliding mechanical supporter to the device 900. On the other hand, the ports 910 and 912 provide electrical connections (for ground and I/O signaling) between the device 900 and circuit traces on the PCB 902, and also provide a fixed mechanical connection between the device 900 and the PCB 902.

When a reflow is used to mount the device 900 on the RF PCB 902, the reflow temperature can be controlled to ensure that only the lower-melting point solder bumps are melted. This melting of the lower-temperature solder enables the electrical and fixed mechanical connections between the device 900 and the RF PCB 902 to be made without any significant effect on the higher melting temperature solder contact bumps 908.

After the reflow operation, the device 900 will be firmly fixed on the RF PCB 902 by the lower melting temperature solder ports 910 and 912, and at least three of the higher melting temperature solder contact bumps 908 will be touching the RF PCB 902 tightly and help support the device 900. As the contact bumps 908 can slide on the RF PCB 902, they will be not be subjected to significant thermal stresses. The lower melting temperature solder ports 910 and 912 do form a fixed mechanical connection, and so will absorb at least some thermal stresses. However, these stresses are minimized by the very short distances separating the ports 910 and 912. Thus, the device 900 will have much better reliability than conventional devices.

Figure 10A:
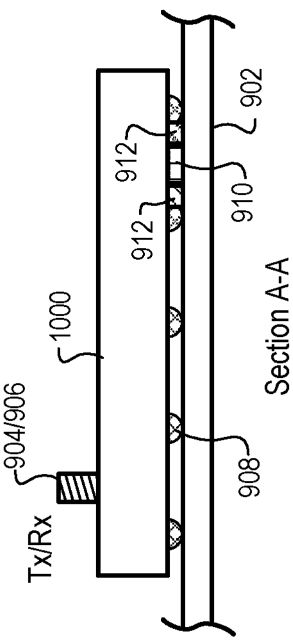
FIGS. 10A-10B respectively show side and bottom views of a fourth example CWG BPF/CS LPF duplexer in accordance with representative embodiments of the present invention.
Figure 10B:
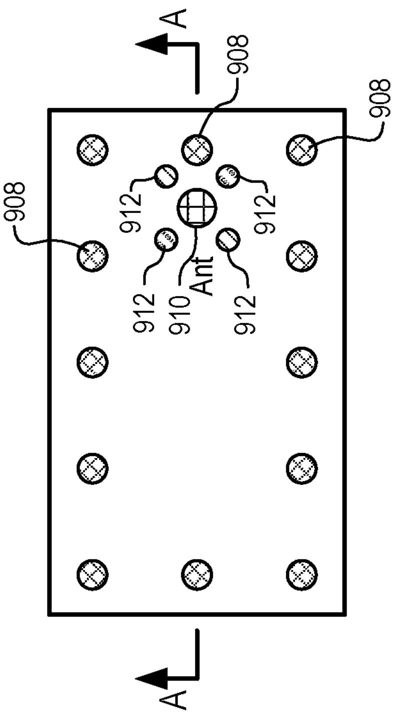

FIGS. 10A and 10B show a variant of the embodiment of FIGS. 9A and 9B, in which the Tx and Rx connectors 904 and 906 are located at one end of the CWG device 1000, and the lower melting temperature solder ports 910 and 912 are located near the other end of the CWG (or CWG/CS composite) device 1000.

Figure 11A:
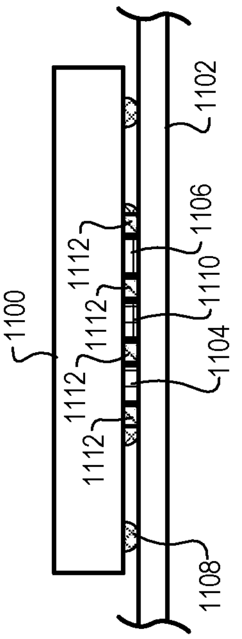
FIGS. 11A-11B respectively show side and bottom views of a fifth example CWG BPF/CS LPF duplexer in accordance with representative embodiments of the present invention.
Figure 11B:
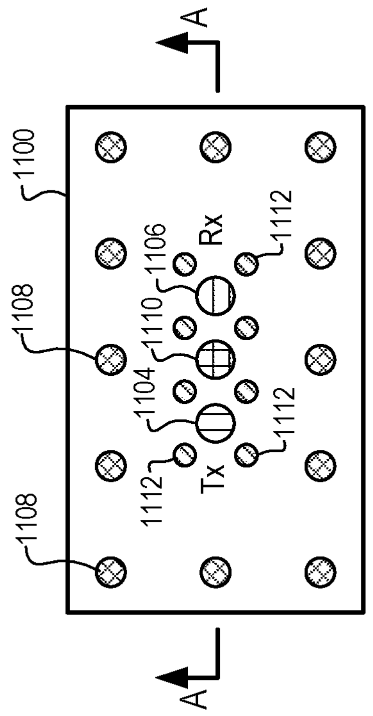

FIGS. 11A and 11B show a further example CWG (or composite CWG/CS) device 1100 mounted on an RF PCB 1102. In the example of FIG. 11, TX and RX I/O ports 1104 and 1106, and an antenna I/O port 1110 are provided on a bottom face of the device 1100, surrounded by a set of ground ports 1112. As may be seen in FIG. 11B, a plurality of contact bumps 1108 are provided around a perimeter of the bottom face of the device 1100.

As in the embodiments of FIGS. 9 and 10, the reliability of the device 1100 illustrated in FIGS. 11A and 11B will also be determined by the lower melting temperature solder ports 1104, 1106,1110, and 1112. As the separation distance between these solder ports is relatively small, the illustrated embodiment will have much better reliability than conventional devices of equivalent functionality.

Figure 12A:
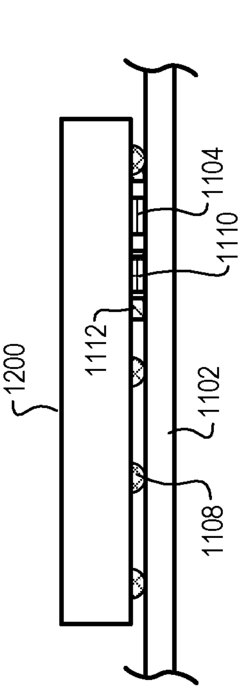
FIGS. 12A-12B respectively show side and bottom views of a sixth example CWG BPF/CS LPF duplexer in accordance with representative embodiments of the present invention.
Figure 12B:
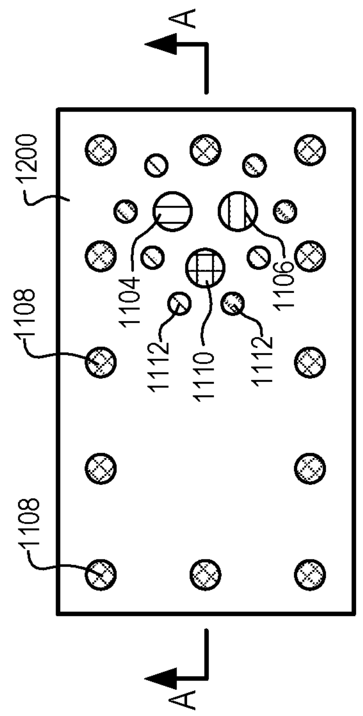

FIGS. 12A and 12B show a variant of the embodiment of FIGS. 11A and 11B, in which the lower melting temperature solder ports 1104, 1106,1110, and 1112 are located near one end of the CWG (or CWG/CS composite) device 1200.

Figure 13A:
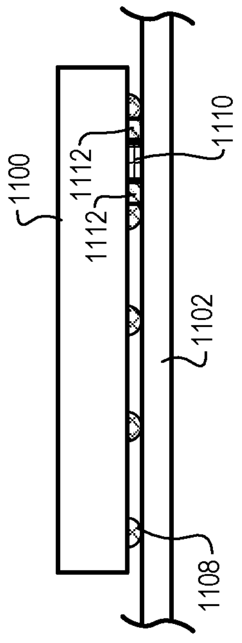
FIGS. 13A-13B respectively show side and bottom views of a seventh example CWG BPF/CS LPF duplexer in accordance with representative embodiments of the present invention.
Figure 13B:
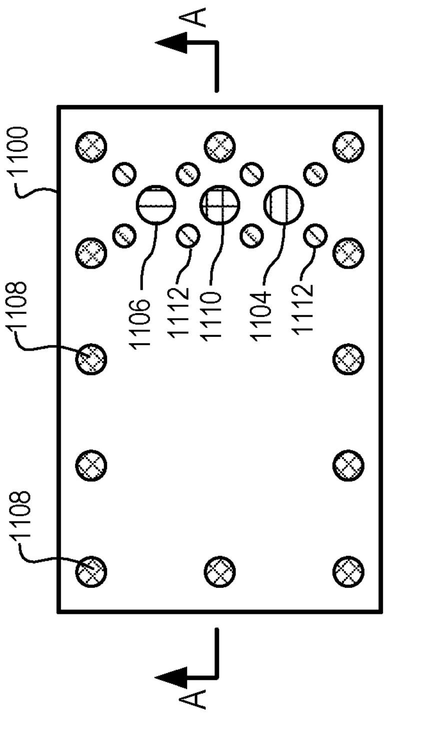

FIGS. 13A and 13B show a further variant of the embodiment of FIGS. 11A and 11B, in which the lower melting temperature solder ports 1104, 1106,1110, and 1112 are located near one end of the CWG (or CWG/CS composite) device 1200.

Figure 14A:
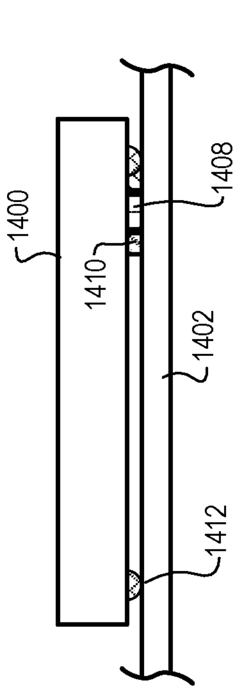
FIGS. 14A-14B respectively show side and bottom views of an eighth example CWG BPF/CS LPF duplexer in accordance with representative embodiments of the present invention.
Figure 14B:
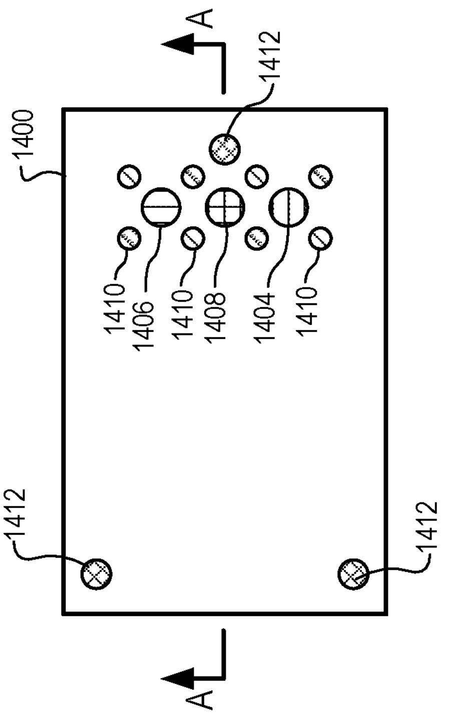

FIGS. 14A and 14B show an example CWG (or composite CWG/CS) device 1400 mounted on an RF PCB 1402. In this example embodiment, TX, Rx and antenna I/O ports 1404, 1406 and 1408 are provided as low-melting temperature solder bumps on a bottom face of the device 1400, surrounded by a set of ground ports 1410. As may be seen in FIG. 14B, a set of three contact bumps 1412 are provided around a perimeter of the bottom face of the device 1400.

As may be appreciated, the use of three contact bumps 1412 is sufficient to provide mechanical stability for the device 1400. Accordingly, the use of three contact bumps may represent a minimum contact pad arrangement. From a production yield point of view, the use of more than three contact bumps may be preferable, to improve mechanical stability and/or electrical grounding. As the contact bumps mainly play a mechanical supporting role to the composite electronic device, so they can be made by using other materials including any one or more of: plastic materials such as PTFE or the like, Ceramic materials, or metals such as silver and copper.

In the embodiments described above with reference to FIGS. 9-14, the use of solder bumps to provide fixed physical and electrical connections, while contact bumps provide sliding support is described in the context of mounting a CWG/CS composite device to a printed circuit board. However, it will be appreciated that the use of solder bumps and contact bumps is not limited to such devices. For example, solder bumps and contact bumps may equally be used for mounting a CWG filter 404 to a printed circuit board, independently of whether or not any other devices (such as CS devices) are also combined with the CWG filter.

While processes in the figures may show a particular order of operations performed by certain embodiments of the present disclosure, it should be understood that such order is representative, and that alternative embodiments may perform the operations in a different order, combine certain operations, overlap certain operations, etc.

Those skilled in the art will recognize improvements and modifications to the embodiments of the present disclosure. All such improvements and modifications are considered within the scope of the concepts disclosed herein.

What is claimed is:

1. A composite electronic device comprising:

a Printed circuit board, PCB, having a first coefficient of thermal expansion; and a ceramic electronic device having a second coefficient of thermal expansion different than the first coefficient of thermal expansion the ceramic electronic device; including:

a ceramic waveguide, CWG, device having at least two input/output, I/O, ports; and a ceramic stripline, CS, device comprising at least one stripline transmission path having at least two I/O ports, the CS device being affixed to the CWG device such that at least one of the I/O ports of the CWG device is eclectically connected to an I/O port of the CS device; and the bottom surface of the ceramic electronic device comprising:

at least three contact bumps disposed on a periphery of the bottom surface, the contact bumps configured for sliding contact with the printed circuit board, PCB;

an I/O port disposed within an inner portion of the bottom surface; and at least one ground port disposed on the bottom surface proximal to the I/O port;

the I/O port and the at least one ground port comprising respective solder bumps configured to form fixed mechanical and electrical connections between the composite electronic device and the PCB.

2. The composite electronic device as claimed in claim 1, wherein the CS device further comprises a via configured to electrically connect an I/O port of the CWG device to a respective I/O port of the composite electronic device.

3. The composite electronic device as claimed in claim 1, wherein the CWG device is configured to operate as a bandpass filter.

4. The composite electronic device as claimed in claim 1, wherein the CWG device is configured to operate as a duplexer.

5. The composite electronic device as claimed in claim 1, wherein the CS device is configured to operate as a lowpass filter.

6. The composite electronic device as claimed in claim 1, wherein the contact bumps are composed of any one or more of:

a plastic material;

a ceramic material; and a metal.

7. The composite electronic device as claimed in claim 6, wherein the metal comprises a solder material having a higher melting temperature than the I/O ports and the ground ports.

8. An electronic device comprising:

a printed circuit board, PCB, having a first coefficient of thermal expansion; and a ceramic electronic device having a second coefficient of thermal expansion different than the first coefficient of thermal expansion, the ceramic electronic device; including:

at least three contact bumps disposed on a periphery of a bottom surface of the ceramic electronic device, the contact bumps configured for sliding contact with the PCB;

an I/O port disposed within an inner portion of the bottom surface; and at least one ground port disposed on the bottom surface proximal to the I/O port;

the I/O port and the at least one ground port respective solder bumps configured to form fixed mechanical and electrical connections between the ceramic electronic device and the PCB.

9. The electronic device as claimed in claim 8, wherein the contact bumps are composed of any one or more of:

a plastic material;

a ceramic material; and a metal.

10. The electronic device as claimed in claim 9, wherein the metal comprises a solder material having a higher melting temperature than the I/O ports and the ground ports.

11. The electronic device as claimed in claim 8, wherein the ceramic electronic device further comprises:

a ceramic waveguide, CWG, device having at least two input/output, I/O, ports; and a ceramic stripline, CS, device comprising at least one stripline transmission paths having at least two I/O ports;

the CS device being affixed to the CWG device such that at least one of the I/O ports of the CWG device is electrically connected to a corresponding one I/O port of the CS device.

* * * * *